Aug. 23, 1949.  R. J. FRETER  2,480,011
METHOD OF MANUFACTURING PIPE NIPPLES OR THE LIKE
Filed Nov. 7, 1945

INVENTOR.
Roy J. Freter.
BY Corbett, Mahoney & Miller
ATTORNEYS.

Patented Aug. 23, 1949

2,480,011

UNITED STATES PATENT OFFICE 2,480,011

METHOD OF MANUFACTURING PIPE NIPPLES OR THE LIKE

Roy J. Freter, Columbus, Ohio, assignor to Landis Machine Company, Waynesboro, Pa., a corporation of Pennsylvania Application November 7, 1945, Serial No. 627,186

4 Claims. (Cl. 29—156)

My invention relates to the method of manufacturing pipe nipples or the like. It has to do, more particularly, with extruding the metal at the end of the pipe, forming a taper on the outer diameter of the pipe, forming a chamfer on the end of the outer diameter of the pipe, and forming a radius or chamfer at the inside diameter at the end of the pipe thereby preparing the pipe for rolling or grinding threads thereon.

In the past, the manufacture of pipe nipples has consisted of cutting to proper lengths, burring or chamfering, and then cutting the threads on each end of the pipe. In cutting of pipe nipples, a length of pipe is severed by cutters to the desired length and this cutting operation forms burrs or ragged edges on the inside periphery of each end of the pipe. At present, a burring tool is inserted into each end of the pipe nipple to cut away or chamfer the ragged edge or burr preparatory to the threading operation. When manufacturers have suitable equipment, the chamfering and threading operations may be combined by inserting a tapered reamer in the thread cutting head.

The function of a nipple is such that it requires a tapered thread controlled by certain prescribed limit tolerances which insures a tight, leak-proof fit when assembled in its mating parts. It is a recognized fact that cut threads cannot be controlled as easily as threads that are rolled or ground. Many factors enter into this, and one in particular is the usually prevalent rough and torn threads characteristic to cut method. Pipe nipples are a low-cost production item, and the necessity of keeping production cost down prevented the feasibility in the past to roll or grind the threads due to the lack of suitable and proper available machinery.

To roll or grind a thread on the nipple, a tapering operation is required on the part to be threaded. To grind or cut this material away preparatory to thread rolling or thread grinding, needless to say, would considerably increase the cost of production. This costly operation has been replaced by an extruding or sizing operation whereby the taper, chamfer, and radius are produced simultaneously and economically.

The use of pipe nipples is very extensive, and it is necessary to keep the cost of these to a minimum but at the same time producing a quality product.

One of the objects of my invention is to provide a pipe nipple which has both of its ends formed by an extruding method whereby the pipe taper on the outer diameter can be formed, the ends of the pipe chamfered on the outer diameter and the radius at its ends on internal diameter be formed.

Another object of my invention is to provide a method and apparatus for chamfering, radiusing and tapering ends of a pipe nipple by extruding or sizing which strengthens the metal and at the same time lengthens the same.

Another object of my invention is that I provide a method for tapering the outside walls of the pipe nipple while maintaining the inside diameter of the nipple constant.

Another object of my invention is to provide a pipe nipple which can be tapered, chamfered, and radiused efficiently so that said end portions can be threaded efficiently by means of the rolled or ground methods, thus producing a higher quality, but cheaper, nipple.

Another object of my invention is to provide a method and apparatus for preparing pipe nipples for threading operations at greatly reduced cost and with a great savings in time.

Various other objects and advantages will be apparent from the drawings and the following detailed description wherein similar characters of reference designate corresponding parts and wherein.

Figure 1:
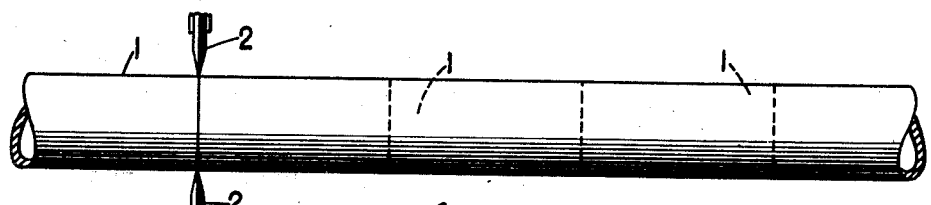
Figure 1 is a side elevational view of a length of pipe showing cutters applied thereto for cutting the pipe to the desired nipple length.

Referring to the drawings, more particularly to Figure 1, I show a length of pipe 1 which is adapted to be cut into desired lengths by means of cutters 2 of the conventional type. This pipe cutting operation cuts the pipe into near nipple lengths 3. In cutting the pipe 1 by means of the cutters 2, a ragged edge or burr 4 is produced and formed on the inner end walls of the pipe.

Figure 2:
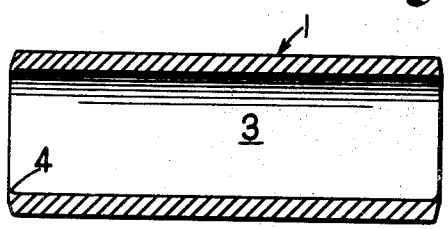
Figure 2 is a sectional view of a pipe cut to a nipple length with a burr formed thereon.
Figure 3:
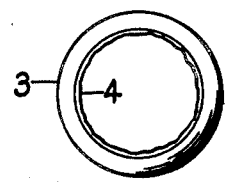
Figure 3 is an end view of Figure 2 showing more clearly the burr formed thereon.
Figure 4:
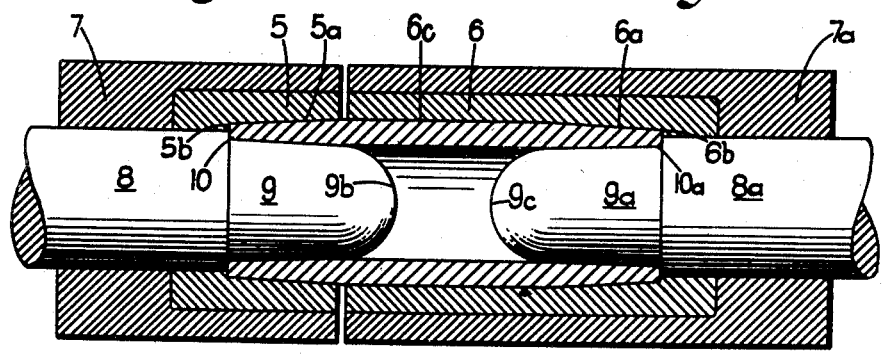
Figure 4 is a side elevational view in section showing the die members for tapering the outer ends of the pipe and also the pins for removing the burr formed on the inner wall of the pipe.

It is necessary to remove the burr 4 and taper each end before a finished nipple can be produced. A nipple may be defined as any short length of pipe having a thread on each end which is used for joining pipes. At present, the practice is to remove the burr by chamfering each end of the pipe after it has been cut to its proper length, or to combine the operation when cut threading in some cases. Figures 2 and 3 show the burr that is formed on the inner end wall of the pipe caused by the cutting operation.

I have found that the burring and tapering of the pipe can be accomplished simultaneously at each end of the pipe in one operation by using extruding or sizing dies of the desired size. To accomplish the burring and tapering of the pipe nipple 3 preparatory to the threading operations, I provide tapered die members 5 and 6 mounted within the housing or holders 7 and 7a. The housings 7 and 7a are provided with pins 8 and 8a whose inner ends are reduced as at 9 and 9a and which are adapted to fit within each end of the nipple 3. The dies 5 and 6 and the burring pins 9 and 9a may be used on a press or reheader machine of the conventional type (not shown). The die 5 is tapered as at 5a and provided with a shoulder 5b to come together with the end of the pipe 3 when the extruding or sizing operation is complete. The pin 8 is provided with a rounded shoulder 10 on the burring pin portion 9. The shoulder 5b and the shoulder 10 align with one another when the extruding operation is complete. The rounded shoulder 10 serves to remove the burr 4 and round the edges of the pipe nipple 3 to give it a smooth radiused finish. The inner end of the burring pin 9 is also provided with a rounded end portion 9b which permits easy entry of the pin 9 within the pipe 3.

The die 6 is similar to the die 5 and is provided with a tapered portion 6a and shoulder 6b similar to the shoulder 5b of the die 5. The die 6 is further provided with a straight portion 6c that is adapted to hold the pipe 3 snugly therein. The pin 8a is provided with a rounded or radiused shoulder 10a and a burring pin 9a having a rounded or radiused end portion 9c.

The operations of burring and tapering the pipe 3 are carried out by inserting the pipe within the die member 6 and then bringing the two die members 5 and 6 together. The burring pins 9 and 9a first enter the opposite ends of the pipe 3 and remove the burrs 4, and at the same time, these pins act as an inner support for the pipe 3 as the tapered die portions 5a and 6a begin to act on the outer wall of the pipe. During the extrusion process, the pins 9 and 9a prevent the pipe 3 from collapsing or distorting as the dies are pressed together. The pressing action continues until the shoulders 5b and 6b align with the shoulders 10 and 10a respectively, thus forming the taper and the chamfered edge of the pipe. The dies 5 and 6 are then moved apart permitting the pipe 3 to be ejected from the dies 5 and 6 by means of the knockout pins 8 and 8a. A stripper mechanism (not shown) strips nipple 3 from knockout pins 8 and 8b by action of said pins being withdrawn into dies 5 and 6.

It will be noted that the length of the die 5 is the length of the tapered portion of one end of the pipe while the length of the die 6 is the length of the tapered portion plus the intermediate portion between the tapered portions of the finished pipe. This is optional. The purpose of this variation in the shapes of the dies is to do the work on one side and thus prevent buckling or any other distortion that might occur. Also, the saving in the number of dies of a given size nipple can be greatly increased. The die portion 5 acts as a plunger while the die 6 is adapted to hold the greater portion of the pipe nipple 3 being worked on.

Figure 5:
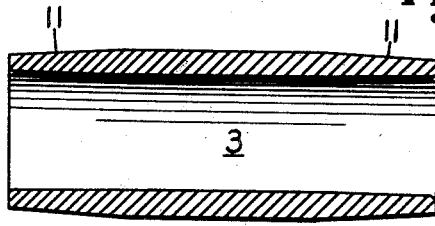
Figure 5 is a side elevational view in section showing the pipe after it has been tapered and burred for a subsequent thread grinding operation.

In Figure 5, I show the nipple 3 after it has been extruded and burred according to my process so that it is in suitable condition for a subsequent threading operation. The tapered ends 11 are uniform and the portions which have been burred by pins 9 and 9a are much smoother than can be accomplished on the present-day burring devices. In the one operation, I taper the ends of the outer end walls 11 of the pipe 3 and simultaneously remove the burr 4 from the inner periphery thereof. The pipe has also been elongated and work-hardened by the extrusion process so that a smaller length pipe can be used to obtain the proper length nipple. A great saving can be realized in material in elongating the nipple 3 since it is a production item.

Figure 5A:
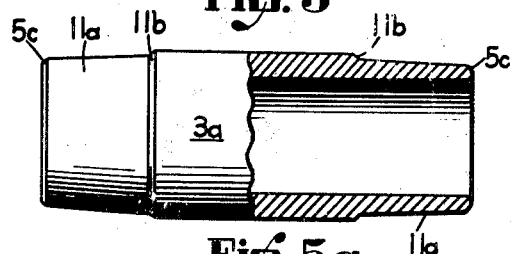
Figure 5a is a side elevational view, partially in section, showing the pipe after it has been prepared, according to my method, for a subsequent thread rolling operation.

It will be understood that certain differences exist between such blanks as prepared for a subsequent grinding operation and those prepared for a subsequent thread rolling operation. An example of the latter is shown in Figure 5a. As is well known in the art of thread rolling, the diameter of the blank to be threaded must be less than that of the desired finished thread by an amount approximately equal to half the thread depth. Therefore, the blank 3a, as prepared for thread rolling, assumes the shape shown in Figure 5a, having the tapered portions 11a at each end thereof, a second pair of conical transition portions 11b between tapered portions 11a and the straight central portion, and a third pair of conically chamfered portions 5c at the extremities thereof. The portions 11b preferably make an angle of approximately 50° with the axis of the pipe. The portions 5c are preferably formed at an angle of 30° with the axis of the pipe. However, these figures are not critical since the only object of the additional portions 5c and 11b is to provide room for the flow of the metal during the thread rolling operation.

The blank nipple shown in Figure 5a is produced in a manner identical with that described above for producing the blank shown in Figure 5. It is merely necessary to form dies 5 and 6 in a manner which will cause them to produce the additional surfaces 5c and 11b. The distance from either end of blank 3a to the beginning of the portion 11b should be made equal to the desired effective thread length of the resulting nipple.

Figure 6:
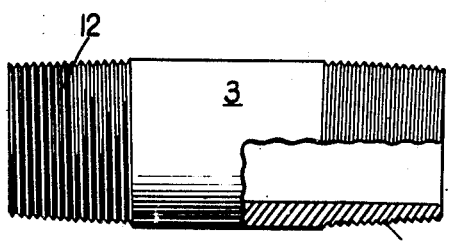
Figure 6 is a side elevational view, partly in section, of the finished threaded nipple.

In Figure 6, I show a finished nipple 3 which has been rolled or ground threaded on the article shown in Figure 5. Rolling and grinding threads 12 on nipples greatly improves them over the present-day cut thread nipples. Besides the fact that the threads are more uniform, experience in rolling and grinding threads has proven that it increases the desired physical properties of the steel and thereby makes a stronger, smoother and better thread. The thread 12, shown on the nipple 3 in Figure 6, is a precision job which can now be used on pipe nipples due to the sizing and burring operations discussed above. The tapering of the ends of the pipe at one time, which has heretofore been prohibitive in articles of this type, can be quickly and cheaply accomplished by my process.

The pipe nipple shown in Figure 5 with its tapered end portions 11 can be rolled or ground threaded, or, if desired, threads can be cut thereon. If this last-named operation is preferred, it can be accomplished much easier than present-day cutting operations since it is not necessary for the cutting chasers to remove excess material to taper the nipple as it cuts the thread. I have described a process for preparing a nipple for a threading operation of any type whatsoever. Primarily, however, the nipple which I have prepared makes possible the use of rolled or ground threading operations which are preferred over cut threads. Threads which are rolled or ground will stand a great deal more tightening and loosening of the pipe at a joint and are not easily destroyed by repeated operations of this type, together with the advantage of a smooth, uniform thread.

I do not show in the drawing any means for rolling or grinding the threads since machines of this type are in use, and I do not claim any novelty in the forming of threads but only in the preparing of the nipple for the threading operation as set out above. Any type of machine can be used for grinding or rolling these nipples which can be used on hollow articles.

Various other advantages will be apparent from the above description, the drawings, and the following claims.

Having thus described my invention, what I claim is:

1. A method of forming pipe nipples comprising the steps of cutting a section of predetermined length from a piece of pipe, the cutting operation reducing the internal diameter at the ends of said section; simultaneously applying uniformly expanding cold-forming forces throughout the entire internal circumference of the end portions of said section to restore the original internal diameter of the section and applying uniformly contracting cold forming forces around the entire circumference of such end portions to impart frusto-conical shape thereto; and then roll-threading the frusto-conical end portions.

2. A method of cold-forming pipe nipples comprising the steps of cutting a section of predetermined length from a piece of pipe, the cutting operation reducing the internal diameter at the ends of said section; simultaneously forcing forming instrumentalities into and onto the ends of said section to restore the original internal diameter thereof, to form internal chamfers at the ends and to apply circumferential reducing forces to the ends of said section to impart frusto-conical shape thereto; and then roll-threading said frusto-conical portions.

3. The method of cold-forming a pipe nipple consisting of the steps of cutting a section of predetermined length from a piece of pipe, the cutting operation reducing the internal diameter of the ends of said section; simultaneously applying internal expanding and external contracting forces throughout the full internal and external circumferences, respectively, of the end portions of the section, by forcing forming instrumentalities into and onto such end portions of the section, to restore the original internal diameter of said section, to form internal and external chamfers at the ends thereof and to impart frusto-conical external shape to the end portions; and then roll-threading the frusto-conical end portions.

4. The method of cold-forming a pipe nipple consisting of the steps of cutting a section of predetermined length from a piece of pipe, the cutting operation reducing the internal diameter of the ends of said section; supporting the intermediate portion of said section to prevent expansion thereof; simultaneously applying internal expanding and external contracting forces throughout the full internal and external circumferences, respectively, of the end portions of the section, by forcing forming instrumentalities into and onto such end portions of the section, to restore the original internal diameter of said section, to form internal and external chamfers at the ends thereof and to impart frusto-conical external shape to the end portions; and then roll-threading the frusto-conical end portions.

ROY J. FRETER.

REFERENCES CITED

The following references are of record in the file of this patent:

UNITED STATES PATENTS

| Number | Name | Date |
|---|---|---|
| 1,276,013 | Beach | Aug. 20, 1918 |
| 1,504,764 | Johnson | Aug. 12, 1924 |
| 1,618,541 | Lang | Feb. 22, 1927 |
| 1,751,448 | Campbell | Mar. 18, 1930 |
| 1,930,745 | Fisher | Oct. 17, 1933 |
| 2,089,784 | Cornell | Aug. 10, 1937 |
| 2,176,993 | Gazey | Oct. 24, 1939 |
| 2,217,194 | Bryce | Oct. 8, 1940 |
| 2,325,480 | Crawford | July 27, 1943 |